US009370780B2

(12) United States Patent
Nolan et al.

(10) Patent No.: US 9,370,780 B2
(45) Date of Patent: Jun. 21, 2016

(54) SCRAP SEPARATION SYSTEM AND DEVICE

(71) Applicants: Shane T. Nolan, Zelienople, PA (US); John S. Alexander, III, Cranberry Township, PA (US); John S. Alexander, Jr., Prospect, PA (US)

(72) Inventors: Shane T. Nolan, Zelienople, PA (US); John S. Alexander, III, Cranberry Township, PA (US); John S. Alexander, Jr., Prospect, PA (US)

(*) Notice: Subject to any disclaimer, the term of this patent is extended or adjusted under 35 U.S.C. 154(b) by 3 days.

(21) Appl. No.: 14/488,866

(22) Filed: Sep. 17, 2014

(65) Prior Publication Data

US 2016/0074875 A1  Mar. 17, 2016

(51) Int. Cl.
B07B 1/20 (2006.01)
B03C 1/30 (2006.01)
C22B 1/00 (2006.01)
C22B 7/00 (2006.01)
B07B 11/00 (2006.01)
C22B 7/04 (2006.01)
B07B 1/56 (2006.01)

(52) U.S. Cl.
CPC ... *B03C 1/30* (2013.01); *B07B 1/20* (2013.01); *B07B 11/00* (2013.01); *C22B 1/005* (2013.01); *C22B 7/005* (2013.01); *C22B 7/04* (2013.01); *B07B 1/56* (2013.01)

(58) Field of Classification Search
CPC ............. B07B 1/18; B07B 1/22; B07B 1/24; B07B 1/28; B07B 1/56; B07B 1/60; B03B 9/04; B03B 9/061; B03C 1/28; B03C 1/30; B03C 2201/20
See application file for complete search history.

(56) References Cited

U.S. PATENT DOCUMENTS

| 1,596,428 | A | * | 8/1926 | Greene | B07B 1/18 209/238 |
|---|---|---|---|---|---|
| 2,047,202 | A | * | 7/1936 | Hardinge | B03B 5/56 209/452 |
| 2,825,453 | A | * | 3/1958 | Lanquist | F26B 11/181 209/2 |
| 2,942,731 | A | * | 6/1960 | Soldini | B03B 5/56 209/270 |
| 3,073,449 | A | * | 1/1963 | Johanningmeier | B07B 1/18 209/11 |
| 3,871,438 | A | * | 3/1975 | Vissers | B22C 5/085 164/131 |
| 4,043,901 | A | * | 8/1977 | Gauld | B07B 4/06 209/10 |
| 4,252,642 | A | * | 2/1981 | Mohri | B03B 5/42 209/452 |
| 4,278,532 | A |   | 7/1981 | Birch et al. | |
| 4,543,180 | A | * | 9/1985 | Riker | B03B 5/42 209/11 |
| 4,549,660 | A | * | 10/1985 | Werling | A01F 12/442 209/44.3 |

(Continued)

*Primary Examiner* — Joseph C Rodriguez
(74) *Attorney, Agent, or Firm* — Cohen & Grigsby, P.C.

(57) ABSTRACT

Methods, systems, and devices to remove slag, sands, and other contaminants from a scrap metal feed. The scrap separation device uses indirect heat provided by one or more heaters which are directed at an external surface of an outer cylinder and a unique arrangement of paddles on an inner surface of an inner cylinder to provide thermal and kinetic energy to dislodge the slag, sands, and other contaminants, and apertures through the inner cylinder to allow the dislodged contaminates to pass to the outer cylinder. The system includes at least one magnetic separation unit, a screening unit, and a scrap separation device. The system removes slag, sands, and other contaminants from a scrap metal feed, and partitions the cleaned scrap metal into various size grades, and the recovered contaminating slag and sands into various size grades.

32 Claims, 6 Drawing Sheets

(56) References Cited

U.S. PATENT DOCUMENTS

| | | | |
|---|---|---|---|
| 5,016,827 A * | 5/1991 | Didion | B22C 5/085 |
| | | | 164/404 |
| 5,095,968 A | 3/1992 | Didion | |
| 5,267,603 A | 12/1993 | Didion | |
| 5,524,769 A * | 6/1996 | Spencer | B03B 9/063 |
| | | | 209/270 |
| 5,613,902 A | 3/1997 | Didion et al. | |
| 5,628,126 A | 5/1997 | North | |
| 5,794,865 A | 8/1998 | Didion et al. | |
| 5,915,569 A * | 6/1999 | Kerrien | B07B 1/18 |
| | | | 209/17 |
| 7,044,307 B2 * | 5/2006 | Kamo | B01D 33/11 |
| | | | 162/276 |
| 7,204,636 B2 | 4/2007 | Didion | |
| 8,245,962 B2 | 8/2012 | Didion | |
| 8,714,467 B2 | 5/2014 | Lucas et al. | |
| 2014/0262968 A1 * | 9/2014 | Fritz | C22B 7/04 |
| | | | 209/12.1 |
| 2015/0209829 A1 * | 7/2015 | De Siqueira | B07B 1/24 |
| | | | 241/19 |
| 2015/0258552 A1 * | 9/2015 | Warkentin | A62D 3/33 |
| | | | 106/638 |

* cited by examiner

SCRAP SEPARATION SYSTEM AND DEVICE

BACKGROUND

1. Technical Field of the Invention

This invention pertains generally to the recovery of ferrous or non-ferrous materials from scrap metals bearing slags, sands, and other contaminants. More specifically, the invention pertains to a scrap separation device for recovering ferrous or non-ferrous scrap metals from mixed scrap containing slag, sands, and other contaminants and a system comprising the scrap separation device which recovers and grades the ferrous and non-ferrous scrap from a dirty scrap metal feed.

2. Description of the Related Art

Metals, in particular the metals used in steel making, play an important role in modern society and have historically been linked with industrial development and improved living standards. Metals used in steelmaking can be draw from metal resources in the Earth's crust as well as from metals discarded after use in the economy. Unlike polymer plastics, the properties of metals can be restored fully through recycling processes, regardless of their chemical or physical form or how many times the metal is recycled. However, success of the secondary metals market depends on the cost of retrieving and processing the metals embedded in used materials. The higher the concentration of metal in a used material, the easier it is to recycle.

Over 11 million tons of iron and steel scrap are produced each year. Of this amount, only about 70 percent is recovered. About ⅔ of the unrecovered iron and steel scrap is land filled. Each ton of recycled steel can save 1.5 tons of iron ore, 0.5 tons of coal, 40% of the water used in production, and 75% of the energy needed to make the steel from the raw materials, and represents a 1.28 ton reduction of solid waste into the waste stream, an 86% reduction in air emissions, and a 76% reduction in water pollution (from the Bureau of International Recycling; http://www.bir.org).

The production of steel also introduces a large amount of material into the waste stream. In addition to the excess material generated during sand casting of steel parts, more than 400 million tons of iron and steel slag is produced each year (from the World Steel Association; www.worldsteel.org). Slag is a mixture of silica, calcium oxide, magnesium oxide, and aluminum and iron oxides. During steel making, slagging agents and fluxes (mainly limestone or dolomite and silica sand) are added to the blast furnace to remove impurities from the iron ore, steel scrap, and other ferrous feeds. The slag protects the liquid metal from outside oxygen and maintains temperature by forming a lid. As such, there is always a certain amount of steel and/or iron trapped in the slag. Beyond the losses of potentially valuable steel and iron in this slag waste, landfilling of these waste products has become increasingly costly.

For years, steel producers have only attempted to recover the larger pieces of steel and/or iron trapped in the waste slag. While this results in a waste slag product that retains a significant portion of unrecovered steel and/or iron, as mentioned above, the concentrations have not been high enough to make the material cost effective for extraction and use in the steel producing process. However, with the recent increases in the prices of raw steel and iron and the energy necessary to produce steel, and the increased cost of landfilling the slag waste, recovery of the iron and/or steel contained in the waste slag has become more important. In addition, once the steel and/or iron are removed from the waste slag, the resulting size graded aggregate can be used in various products, such as in construction aggregate, in concrete products, in road bases and surfaces, and as fill, clinker raw material, railroad ballast, roofing, mineral wool (for use as insulation) and soil conditioner.

Systems known in the art for recovering steel and/or iron from the waste stream, particularly from slag and green mold castings, typically use magnetic separators and impacting devices. The impacting devices are generally rotary tumblers equipped with blades or teeth that lift and drop the waste material in an effort to dislodge the slag or sands. Certain devices have further included a solid media which may provide further scrubbing action. More recent rotary devices have also included a crushing means to reduce the size of the input material. However, none of the prior art devices provide a means other than impact or abrasion to free the steel and/or iron from the contaminating slag or sands. Furthermore, none of the prior art systems provide a means for recovery of size graded contaminating slag and sands, or size grading of the recovered scrap metal.

Accordingly, there exists a need in the prior art for a device and system which may be used to recover ferrous materials such as steel and iron from scrap metals which are contaminated with slag, sands, and other contaminants. Additionally, there exists a need in the prior art for a device and system which may partition the purified steel and iron into various size grades, and may also partition the recovered contaminating slag and sands into various size grades.

SUMMARY

The presently disclosed invention overcomes many of the shortcomings of the prior art by providing a scrap separation device which uses indirect heat to release slag, sands, and other contaminants that may be attached or co-mingled with the scrap metal. The device includes two rotating concentric cylinders; an outer cylinder and an inner cylinder having a smaller diameter than the outer cylinder. The inner cylinder comprises a unique arrangement of paddles to provide kinetic energy to remove the attached or comingled contaminants, and a unique arrangement of apertures to allow a portion of the released slag and sands and/or other contaminants to pass to the outer cylinder. The outer cylinder is heated on an external surface to aid in the release of the attached or comingled contaminants from the scrap metal, and to reduce occlusion of the various apertures on the inner cylinder and/or screens on the outer cylinder.

The presently disclosed invention further includes a system which comprises at least one magnetic separation unit, a screening unit, and a scrap separation device. The system may use the magnetic separation unit to partition the dirty scrap metal into a ferrous or a non-ferrous feed prior to entry into the scrap separation device, and may use screening units to partition the cleaned scrap into various size grades, and the recovered contaminants into various size grades. Additional magnetic separation units and screen units may be included to further define the cleaned scrap and contaminates recovered from the scrap separation device, or to further define the scrap materials prior to entry into the scrap separation device.

Thus, according to its major aspects, and briefly stated, the presently disclosed invention includes a scrap separation device for separating scrap metals from slag, sands, and other contaminants. The device comprises an inner cylinder and a concentric outer cylinder. The inner cylinder has a first end for receiving a scrap metal comprising slag, sands, and contaminants and a second end for dispatching the scrap metal which is substantially cleaned of the slag, sands and contaminants, wherein a portion of the inner cylinder at or near the second end comprises apertures therethrough sized to pass a portion of the slag, sands, and contaminants and retain a majority of the scrap metal. The outer cylinder has a first end and a second end and is designed to collect the slag, sands, and contaminants passed through the apertures in the inner cylinder. The inner cylinder comprises a plurality of paddles positioned on an inner surface, wherein the paddles placed at or near the first and second ends may be angled to urge the scrap metal longitudinally from the first end toward the second end, and the paddles in a middle region are designed to increase the residence time of the scrap metal in the middle region and cause the scrap metal to be lifted and dropped during rotation of the inner cylinder. The outer cylinder comprises at least one helical vane positioned on an inner surface to move the collected slag, sands, and contaminants longitudinally through the outer cylinder. Alternatively, the at least one helical vane may be place substantially between the inner and outer cylinder.

The device further comprises at least one heater positioned to heat an outer surface of the outer cylinder, a base for supporting the inner and outer cylinders horizontally along their longitudinal axes, and a means for rotating the inner and outer cylinders along their longitudinal axes.

In certain embodiments of the scrap separation device, the paddles in the middle region of the inner cylinder may be positioned parallel to the longitudinal axis of the inner cylinder and may occupy a region corresponding to about one third the total length of the inner cylinder. Furthermore, the paddles at or near the first and second ends of the inner cylinder may be angled at about 25 degrees relative to the longitudinal axis of the inner cylinder and may occupy a region corresponding to about one third the total length of the inner cylinder at each of the ends of the inner cylinder.

In certain embodiments of the scrap separation device, the paddles may extend radially from the inner wall of the inner cylinder by a distance that is about twice the size of the majority of the scrap metal. The apertures in a portion of the inner cylinder may be between 1 inch and 2 inches in diameter. Furthermore, the portion of the inner cylinder comprising apertures may be about one-third, or even about one-half of the length of the inner cylinder. In embodiments, the means for rotating the inner and outer cylinders along their longitudinal axes may comprise a motor attached to the base and configured to drive a belt or chain that cooperates with an outer surface of the outer cylinder.

In embodiments of the scrap separation device, the at least one helical vane moves the collected slag, sands, and contaminants toward the first end of the outer cylinder. The outer cylinder may be shorter than the inner cylinder, such that the inner cylinder extends beyond the outer cylinder at the first end. In this way, the collected slag, sands, and contaminates may exit from the outer cylinder at a point distant from the input or output of the inner cylinder. In certain other embodiments, the outer cylinder may comprise at least one screen at the first end which may allow the collected slag, sands, and contaminants to be further size graded.

In certain embodiments of the scrap separation device, the outer cylinder may be closed at the first end and may provide means to recirculate the portion of the collected slag, sands, and contaminants that did not pass through the screen at the first end of the outer cylinder. In this way, larger contaminants may be recirculated back into the inner cylinder to go through an additional processing cycle (e.g. another pass through the inner cylinder from the entrance to the exit end).

Further, the at least one heater may be positioned to heat an outer surface of the outer cylinder at the first end of the outer cylinder corresponding to a length of about one half the total length of the outer cylinder, or along the entire length of the outer cylinder.

In embodiments of the scrap separation device, the at least one heater may be adjustable. The adjustment may be to the temperature output of the heater, the length of time that the heater is active, the distance from the outer surface of the outer cylinder, or the angle of the heater.

In embodiments of the scrap separation device, the scrap metal may be ferrous or non-ferrous scrap metal having a dimension on any side not larger than twelve inches. In certain other embodiments, the scrap metal may be ferrous or non-ferrous scrap metal having a dimension on any side not larger than eight inches.

The presently disclosed invention also includes a system for separating scrap metal from slag, sands, and other contaminants. The system comprises at least a scrap separation device as substantially disclosed in any of the embodiments described above, and a magnetic separation unit. The magnetic separation unit may be configured to accept scrap metal comprising slag, sands, and other contaminants from a transport device and separate the scrap metal into ferrous and non-ferrous scrap metal comprising slag, sands, and to her contaminants. The scrap separation device may then accept either the ferrous or the non-ferrous scrap metal comprising slag, sands, or other contaminants from the magnetic separation unit.

In certain embodiments of the system, the transport device may be one or more of a scalping device, a conveyor belt, a screw auger, a pneumatic transport, a vibratory conveyor, a surge hopper, a feeder, a slider chute, or any combination thereof. Further, the system may also comprise one or more of a conveyor belt, a vibratory conveyor, a feeder, a slider chute, or combinations thereof, which transports the scrap metal from the magnetic separation unit to the scrap separation device.

Certain embodiments of the system may further comprise a primary screening grid positioned before the magnetic separation unit, wherein the primary screening grid prevents oversized scrap metal comprising slag, sands, and other contaminants from entering the magnetic separation unit. The oversized scrap metal comprising slag, sands, and other contaminants may be ferrous or non-ferrous scrap metal having a dimension on any side larger than twelve inches.

Certain embodiments of the system may further comprise at least one screen positioned to separate the scrap metal cleaned of the slag, sands, and contaminants based on a size of the scrap metals. The screen may separate the scrap metals cleaned of the slag, sands, and other contaminants into grade A, grade B, or grade C scrap metal.

Certain embodiments of the system may further comprise a second magnetic separation unit configured to accept the collected slag, sands, and contaminants from the first end of the outer cylinder of the scrap separation device and separated that material into a ferrous and a non-ferrous feed stream.

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the presently disclosed invention, unless stated to be otherwise, are not necessarily drawn to scale.

DETAILED DESCRIPTION

Figure 1:
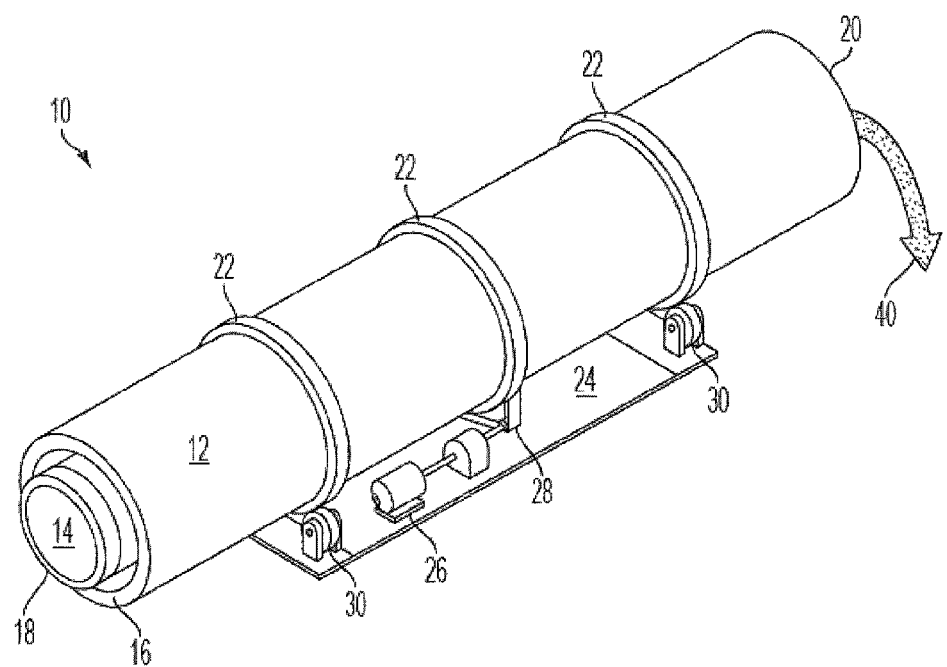
FIG. 1 illustrates a perspective view of a scrap separation device in accordance with certain aspects of the presently disclosed invention.

In the following description, the presently disclosed invention is set forth in the context of various alternative embodiments and implementations involving a scrap separation system and device which may reclaim ferrous and/or non-ferrous scrap metals from a feed stream comprising ferrous and non-ferrous metals contaminated with slag, sands, and other contaminants.

Various aspects of the scrap separation system and device may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Various aspects of the scrap separation system and device may be illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the word "comprising" as used herein means "including, but not limited to".

Furthermore, throughout the specification, reference to "one embodiment," "an embodiment," or "some embodiments" means that a particular described feature, structure, or characteristic is included in at least one embodiment. Thus, appearances of the phrases "in one embodiment," "in an embodiment," or "in some embodiments" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

Relative terms such as "lower" or "bottom" and "upper" or "top" may be used herein to describe one element's relationship to another element illustrated in the drawings. It will be understood that relative terms are intended to encompass different orientations of aspects of the scrap separation device in addition to the orientation depicted in the drawings. By way of example, if aspects of the scrap separation device shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

In various embodiments described herein, certain exemplary values are specified as a range. It will be understood herein that a given range includes all integers and sub-ranges comprised within a cited range. For example, citation of a range "1.0× to 12.0×" provides specific values within the cited range, such as, for example, 2.0×, 6.0×, and 9.0×, as well as various combinations of such specific values, such as, for example, 2.0× and 12.0×, or 2.0× and 4.0×, as well as sub-ranges such as 1.0× to 4.0×, or 2.0× to 8.0×, etc.

As used herein, "about" refers to any inherent measurement error or a rounding of digit(s) for a value. As such, each numerical parameter should at least be construed in light of the number of reported significant digits and by applying ordinary rounding techniques.

It must also be noted that as used herein and in the appended claims, the singular forms "a", "an", and "the" include the plural reference unless the context clearly dictates otherwise. Thus, for example, reference to a "paddle" is a reference to one or more paddles and equivalents thereof known to those skilled in the art, and so forth. Unless defined otherwise, all technical and scientific terms used herein have the same meanings as commonly understood by one of ordinary skill in the art.

Referring now to the drawings, embodiments of the scrap separation device of the presently disclosed invention are shown in FIGS. 1-4 generally designated by the reference numeral 10. FIG. 1 illustrates a perspective view of an embodiment of the scrap separation device 10 comprising an outer cylinder 12 having a first end 16 and a second end 20, and an inner cylinder 14 having a first end 18 and a second end 20. The outer cylinder 12 is concentric with the inner cylinder 14 which has a smaller diameter than the outer cylinder and fits within the outer cylinder. The two cylinders (12, 14) are attached such that rotation of the outer cylinder produces a simultaneous rotation of the inner cylinder. Further, both cylinders (12, 14) are supported horizontally with respect to their longitudinal axis.

With continued reference to FIG. 1, the outer cylinder 12 comprises support ribs, rings or races 22 which may ride on wheels 30 that are attached to or part of a base 24. While three support ribs 22 are shown in FIG. 1, more than three or less than three support ribs 22 would be within the scope of the presently disclosed invention. The two cylinders (12, 14) may be rotated by the action of a motor 26 which drives a belt or chain 28 that cooperates with one or more of the ribs 22 on the outer surface of the outer cylinder 12. While support ribs 22 and wheels 30 are shown, other arrangements and means for supporting and rotating the cylinders (12, 14) such as, for example, bearings or rotating rods, is within the scope of the presently disclosed invention.

The base 24 may be formed as a solid structure, as shown, or may be formed as a series of struts or other support means. Furthermore, the base 24 may be designed to comprise shock absorption means such as, for example, springs or shock absorbers, to dampen vibrations caused during rotation of the cylinders (12, 14), especially when loaded with scrap metal.

Figure 3:
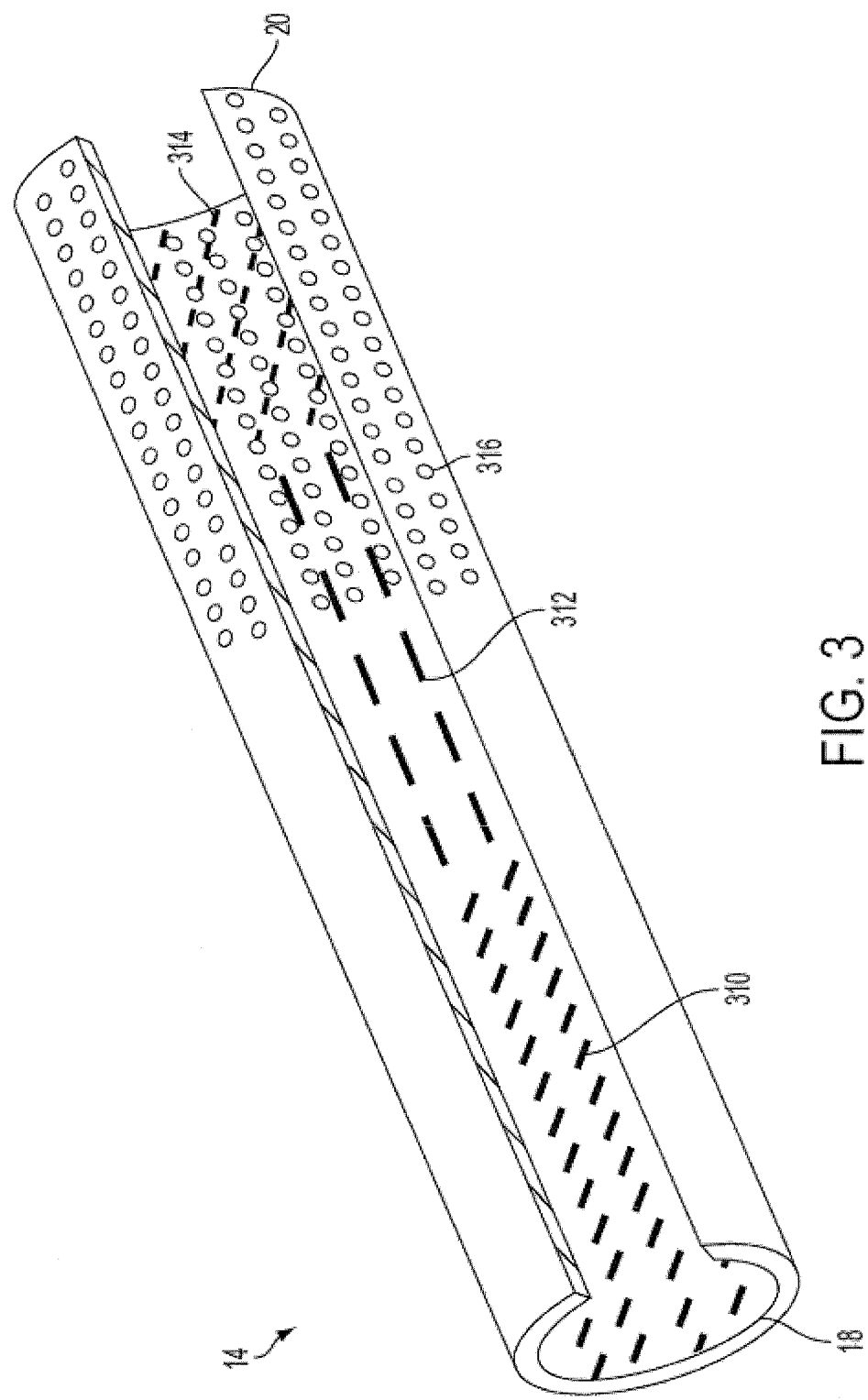
FIG. 3 illustrates a sectional view of the inner cylinder of the scrap separation device showing placement of paddles and apertures in accordance with certain aspects of the presently disclosed invention.

In use, dirty scrap material may be loaded into the scrap separation device 10 at the first end 18 of the inner cylinder 14. The material substantially cleaned of smaller slag, sands, and other contaminants may exit from the second end (arrow 40) of the inner cylinder 14. With reference to FIG. 3, the dirty scrap material may first encounter a first region of the inner cylinder 14 which comprises paddles 310 attached to the inner wall. These paddles 310 may be positioned and angled to assist in longitudinal movement of the scrap material through the inner cylinder 14 from the first end 18 to the second end 20 when the cylinder is rotated. In certain embodiments, the paddles 310 may be angled at about 5° to about 85° relative to the longitudinal (horizontal) axis of the inner cylinder 14. In a preferred embodiment, the paddles 310 may be angled at about 15° to about 55°, at about 25° to about 45°, or at about 25°, relative to the longitudinal axis of the inner cylinder 14. Further, the paddles 310 may be positioned in rows, or alternatively, in steps or flights which are longitudinally offset and which may further assist in the longitudinal movement of the scrap material through the inner cylinder 14 from the first end 18 to the second end 20 when the cylinder is rotated.

As the dirty scrap material moves from this first region of the inner cylinder 14 toward a second or middle region, the paddles 312 may be positioned and angled to reduce the speed of movement of the dirty scrap material through the inner cylinder 14. That is, the paddles 312 attached to the inner wall at the middle region may be angled parallel to the longitudinal axis of the inner cylinder 14 (e.g. positioned horizontally). Further, the paddles may be positioned in rows, rather than in steps or flights as was indicated for the paddles 310 in the first section of the inner cylinder 14. As such, the dirty scrap material may be delayed in this middle region and may be tumbled more vigorously. The kinetic energy provided by this vigorous tumbling may aid in release of the slag, sands, and other contaminants from the scrap material as the material is repeatedly lifted and dropped. Continuous accumulation of scrap material in this middle region of the inner cylinder 14 may eventually push material through the middle region toward the second end 20 when the cylinder is rotated.

The slag, sands, and contaminates which are released from the dirty scrap metal may be tumbled alongside the scrap material, and may provide a scrubbing action which assists in further cleaning the scrap material. With continued reference to FIG. 3, the middle region of the inner cylinder 14 may further comprise apertures 316 therethrough which allow a portion of the released slag, sands, and contaminates to pass from the inner cylinder 14 to the outer cylinder 12. These apertures 316 may be located partway through the middle region of the inner cylinder 14. In certain embodiments, the apertures 316 may be located in the second half of the inner cylinder 14 as measured from the second end 20. In certain embodiments, the apertures 316 may be located in the last one third of the inner cylinder 14 as measured from the second end 20.

The apertures 316 may be of any size and shape. In certain embodiments, the apertures 316 may be round and have a diameter of between about 1 inch and 2 inches. In certain other embodiments, the apertures may have a diameter less than about 1 inch, such as ¼ inch or ½ inch, or may have a diameter greater than about 2 inches such as, for example, between 2 inches and 4 inches. Furthermore, the size and/or shape of the apertures 316 may be varied along the length of the inner cylinder 14.

As the scrap material is pushed from the middle region by the accumulation of scrap material, as detailed above, or the passage of time, it may enter a third region of the inner cylinder 14 which generally comprises paddles 314 and apertures 316. The paddles 314 in the third region may be attached to the inner wall, and may be positioned and angled to assist in longitudinal movement of the scrap material through the inner cylinder 14 from the first end 18 to the second end 20 when the cylinder is rotated. In certain embodiments, the paddles 314 may be angled at about 5° to about 85° relative to the longitudinal (horizontal) axis of the inner cylinder 14. In a preferred embodiment, the paddles 314 may be angled at about 15° to about 55°, at about 25° to about 45°, or at about 25°, relative to the longitudinal axis of the inner cylinder 14. Further, the paddles 314 may be positioned in rows, or alternatively, in steps or flights which are longitudinally offset and which may further assist in the longitudinal movement of the scrap material through the inner cylinder 14 from the first end 18 to the second end 20 when the cylinder is rotated.

The paddles (310, 312, and 314) may be designed to cause the scrap metal to be lifted and dropped during rotation of the inner cylinder 14. In certain embodiments, this may be achieved by providing paddles (310, 312, and 314) which have a radial depth and a longitudinal width that is about 1.0× to about 12.0× the size of the majority of the dirty scrap material loaded into the first end 18 of the inner cylinder 14. In a preferred embodiment, the paddles (310, 312, and 314) may have a radial depth that is about 1.0× to about 6.0× the size of the majority of the dirty scrap material, and a longitudinal width that is about 1.0× to about 12.0× the size of the majority of the dirty scrap material. The depth and width of the paddles (310, 312, and 314) may be varied within each region or may be varied from one region to another.

As example, a device designed to clean scrap comprising a majority of material which is about 3 inches in diameter may have paddles (310, 312, and 314) that are about 6 inches deep (2×; measured as a radial depth from the inner wall of the inner cylinder) and about 24 inches wide (8×; measured as a longitudinal length along the inner wall of the inner cylinder). Further, the paddles (310, 312, and 314) may be formed of ¼" thick steel angle stock which is cut to length and welded along one side to the inner wall of the inner cylinder 14.

The various portions of the inner cylinder 14 described above as the first, second, and third regions may be of any length suitable to achieve optimal removal of the slag, sands, and contaminates from the scrap metal. In certain embodiments, the three regions may be evenly distributed along the length of the inner cylinder 14 so that each region occupies about one third of the total length. As such, the paddles 310 in the first region closest to the first end 16 would occupy the first one third of the inner cylinder 14, the paddles 312 in the second region would occupy the middle one third, and the paddles 314 in the third region would occupy the final one third. Different types of scrap metal, sizes of scrap metal, or levels of contamination in the scrap metal feed may dictate different divisions of the three regions.

Furthermore, and as described above, the dimensions of the paddles (310, 312, and 314), and the angles of the paddles may be varied within each region or may be varied from one region to another. As example, the first region of the inner cylinder 14 may have several rows of paddles 310 nearest the first end 18 which may be angled at about 45° relative to the longitudinal axis of the cylinder, and several rows of paddles 310 placed just prior to the second region which may be angled at about 22.5°. This reduction in the angle of the paddles 310 just prior to entry into the second or middle region of the inner cylinder 14 may act to slow the movement of the scrap material. The paddles 312 in the second or middle region may be angled parallel to the longitudinal axis of the cylinder. As discussed above, the dirty scrap material may be delayed in this middle region and may be tumbled more vigorously. Finally, paddles 314 in the third region of the inner cylinder 14 may have varied angles; the several rows closest to the middle region may be angled at about 22.5° relative to the longitudinal axis of the cylinder, while the rows of paddles 314 closest to the exit end 20 may be angled at about 45°. While specific angles have been listed in this example, they are for illustrative purposes only and are not meant to limit the presently disclosed invention.

Figure 2:
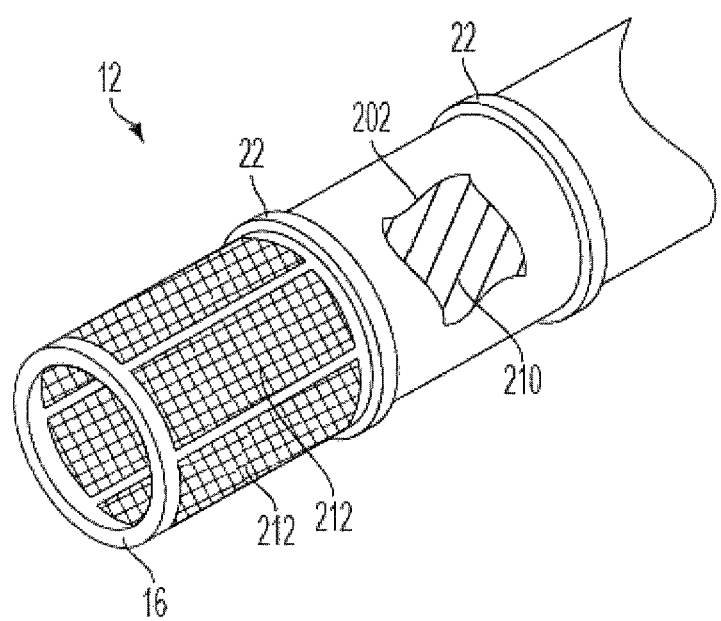
FIG. 2 illustrates a partial perspective view of the outer cylinder of the scrap separation device with a cut-away to show helical vanes positioned on an inner surface of the outer cylinder in accordance with certain aspects of the presently disclosed invention.

Slag, sands, and other contaminants that have been released from the scrap metal through the actions of heat and/or tumbling may pass through the apertures 316 in the inner cylinder 14 to the outer cylinder 12. With reference to FIG. 2, the outer cylinder 12 may comprise at least one helical vane 210 (as shown through the cutaway section 202) positioned on an inner surface. The at least one helical vane 210 may cause the slag, sands, and other contaminants to move through the outer cylinder 12 toward either the first end 16 or the second end 20 during rotation. In a preferred embodiment, the at least one helical vane 210 causes movement of the slag, sands, and other contaminants from the second end 20 toward the first end 16 of the outer cylinder 12 during rotation, as shown in FIG. 2.

In certain alternative embodiments, the at least one helical vane 210 may be positioned on au outer surface of the inner cylinder 14, or helical vanes may ice positioned on both the inner surface of the outer cylinder 12 and the outer surface of the inner cylinder 14. In certain embodiments, the at least one helical vane 210 may extend entirely between the inner cylinder 14 and the outer cylinder 12 such that the vane is substantially attached to both cylinders. This may provide a means to connect or attach the two cylinders (12, 14).

In certain embodiments, the outer cylinder 12 may be shorter than the inner cylinder 14, such that the inner cylinder 14 extends beyond the outer cylinder 12 at the first end. In this way, the collected slag, sands and contaminates may exit from the outer cylinder at a point distant from the input or output of the inner cylinder 14. In certain embodiments, the outer cylinder 12 may comprise at least one screen 212 at the first end 16 which may allow the collected slag, sands, and contaminants to be further size graded and/or to exit the outer cylinder 12 (arrow 440). The at least one helical vane 210 may terminate at a position just before or at the start of the at least one screen 212.

The screen(s) 212 may be of any size and configuration. In certain embodiments, the screen(s) 212 may be sized at about ¼ inch, about ½ inch, about ¾, or about 1 inch or greater. In certain embodiments, the screen(s) 212 may be sized smaller than the apertures 316, such that not all of the material that passes through the apertures 316 will pass through the screen 212. This material may exit the outer cylinder 12 from the first end 16, or in certain embodiments, the first end 16 of the outer cylinder 12 may be closed and a portion of the collected slag, sands, and other contaminants may be recirculated into the inner cylinder 14 for another passage through the scrap separation system 10 (discussed below). The size of the screen(s) 212 may be varied and may depend on the size and nature of the input scrap material.

As mentioned above, in certain embodiments, the slag, sands, and contaminants that are collected in the outer cylinder 12, and which do not pass through the screen 212, may be recirculated back into the entrance of the inner cylinder 14 by a recirculation means (not shown). This recirculated material may still contain ferrous or non-ferrous scrap metals, and the recirculation through the inner cylinder 14 for further processing may release additional slag, sands and contaminants from the valuable scrap metals. In such an embodiment, the first end 16 of the outer cylinder 12 may be closed or fused with the first end 18 of the inner cylinder 14. The recirculation means may be slots in the inner cylinder 14 near the first end which allow material to pass from the outer cylinder 12 to the inner cylinder 14. Alternatively, a region at or near the first end 16 of the outer cylinder 12 may include a trough into which this material may fall and be passed back into the inner cylinder 14 using any of: (a) slots or openings in the inner cylinder 14, (b) vanes or other paddles positioned on either the exterior of the inner cylinder, the interior of the outer cylinder, or both cylinders, or (c) or a combination thereof.

The recirculated material may eventually attrition and exit the dual drum device as cleaned scrap metal (arrow 40) and/or slag, sands, and other contaminants (arrow 440). Further, the recirculated material may act as additional media, providing abrasive cleaning action on the scrap metal in the inner cylinder 14 of the scrap separation device 10. Material that does not exit the device 10 from either exit (arrow 40, or arrow 440) may be manually removed, or may be attritional through larger sized slots in the screen 212. Such slots (not shown) would allow small quantities of this larger material to exit the device 10, reducing the risk of a build-up of such material in certain applications.

Figure 4:
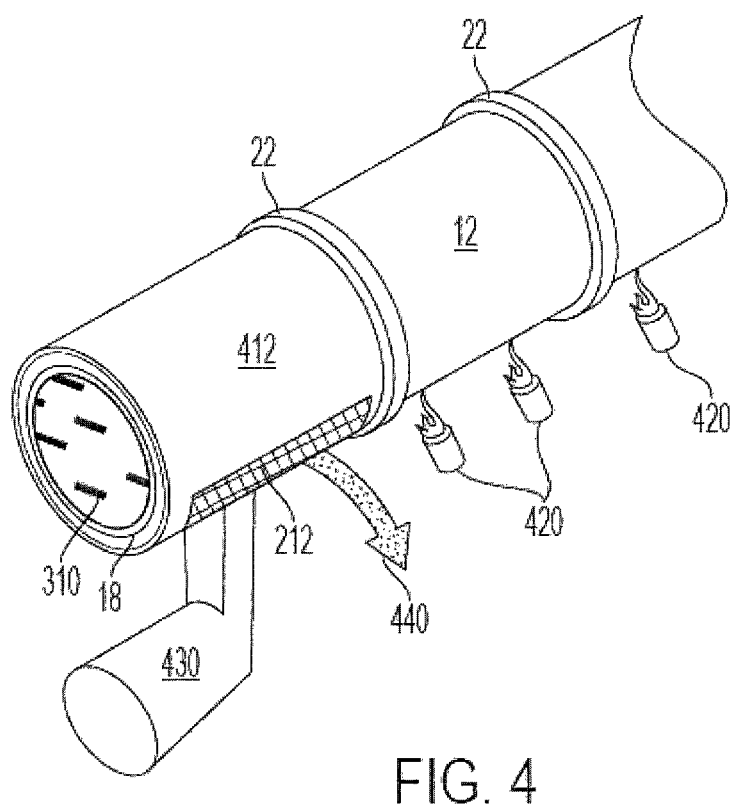
FIG. 4 illustrates a partial perspective view of the scrap separation device in accordance with certain aspects of the presently disclosed invention.

With reference to FIG. 4, the at least one screen 212 may be protected on a substantial portion of the outer cylinder 12 by a hood 412 or other covering means. The hood 412 may allow material which has passed through the screen 212 (arrow 440) to exit through at an open bottom portion into a bin or onto a conveyance means (not shown). In certain embodiments, the hood 412 may include a chute or downward facing sidewalls to further aid in directing the material into the bin or onto the conveyance means. As such, the hood 412 may direct dust or other smaller particulate matter downward into the bin or conveyance means, and thus protect the area above and to the sides of the scrap separation device 10 from damage (e.g. protect people and/or other equipment).

The hood 412 may be attached to supports so that is remains stationary while the cylinders (12, 14) rotate therein. The hood 412 may be mounted using supports, or may include a lower section which is supported on the base 24, on another base (not shown), or on the ground.

With continued reference to FIG. 4, the scrap separation device 10 may further comprise at least one heater (420 and/or 430) arranged to provide indirect heat to the slag, sands, or other contaminants adhered to or comingled with the scrap metal. The at least one heater (420 and/or 430) may be positioned outside of the two cylinders (12, 14) and may be directed to heat an outside surface of the outer cylinder 12. The heater(s) (420 and/or 430) may be burners which use oil, gas, natural gas, or propane, and may have any number of jets. In an exemplary embodiment, a cylinder heater 420 may be a burner comprising 32 brass jets, where each brass jet may produce about 10,000 BTU's of heat. These jets may be directed so that the tip of the flame directly contacts the outside surface of the outer cylinder 12. Furthermore, an additional screen heater(s) 430 may be directed toward the at least one screen 212 and may aid in keeping the screen clear of any accumulated material (e.g. keep the screen from blinding or clogging due to accumulated slag, sands, or other contaminants). The heat or flames from this screen heater 430 may be directed or aimed toward the screen(s) 212 by a housing and/or blower (as shown), thus allowing the heater 430 to remain out of the way of the material falling through the screen(s) 440.

The heater(s) (420 and/or 430) may be adjustable to provide the maximal separation of slag, sands, and other contaminates from the scrap metal. The adjustments may be to the temperature output of the heater (i.e. to the number of jets on a burner), the distance of the heater from the outer surface of the outer cylinder 12, the number of heaters provided, the angles of the heater(s), the locations of the heaters along the length of the cylinder 12, or the length of time the heater is used. Furthermore, in certain embodiments, the heater(s) may be positioned to provide heat to the outer surface of the outer cylinder 12 at or near the first end 16 corresponding to a length of about one half the total length of the outer cylinder 12. In certain other embodiments, the heater(s) (420 and/or 430) may be positioned to provide heat to the outer surface of the outer cylinder 12 along the total length of the outer cylinder 12. In certain embodiments, the screen heater 430 may be angled to heat the screen(s) 212 and an outer surface of the inner cylinder 14, and may thus provide heat to the dirty scrap metals as they enter the scrap separation device 10.

Placement of the heater(s) (420 and/or 430) in the scrap separation device of the presently disclosed invention are innovative and provide improved scrap separation over prior art devices and systems. Prior art heaters placed at either end of the inner cylinder may act to displace smaller materials, often "blowing" them back into the feed stream. As such, the separation of such materials is not as efficient, and the need for containment of such contaminants is introduced (e.g. the need to keep such materials from entering the environment).

The scrap separation device 10 of the presently disclosed invention uses the combined actions of heat, friction, and kinetic energy to release the slag, sands, and other contaminants from the scrap metal. The unique design and arrangement of paddles (310, 312, 314) urges the dirty scrap material through the device 10 from the entry point 18 to the exit 20. In the first region, the dirty scrap metal may be indirectly heated through the action of heater(s) (420 and/or 430) to cause the release of the slag, sands, and contaminates which may be adhered through hydrophilic, hydrophobic, ionic or other chemical bonds. The dirty scrap metal is also tumbled or lifted and dropped by the paddles 310, adding a kinetic energy which may knock-off or release the contaminants.

As the paddles 310 urge the scrap metal toward the second or middle region, the unique configuration and design of the paddles 312 in this region may provide an increased tumbling action, and may hold the scrap metal in the middle region for an extended time (e.g. a longer residence time in the middle region than in the first region). Additionally, as the released contaminating material builds up in this middle region, it may add additional friction or "scrubbing" for the scrap metal. As new scrap metal is passed into this region, older material may be pushed through and ultimately out to the third region of the inner cylinder 14. In certain embodiments, the middle region of the inner cylinder 14 also comprises apertures which allow a certain portion of the slag, sands, and other contaminants to pass to the outer cylinder 12 depending upon the size and shape of the apertures. In certain other embodiments, the scrap metal in this region may be indirectly heated through the action of heater(s) (420 and/or 430) to cause additional release of the slag, sands, and contaminates which may be adhered through hydrophilic, hydrophobic, ionic or other chemical bonds.

Once the scrap metal has been pushed to the third region, the paddles 314 urge the material toward the exit 20 of the inner cylinder 14. The apertures 316 in this region allow further amounts of slag, sands, and other contaminants to pass to the outer cylinder 12. The scrap metal stream 40, substantially cleaned of these contaminates, may now exit the inner cylinder 14 from the second end 20. The slag, sands, and other contaminants that now reside in the outer cylinder 12 are passed back toward the first end 16 of the outer cylinder by the at least one helical vane 210. This material may be further screened for size at screen(s) 212 which provides a waste feed stream 440, or may be passed directly out of the first end 16. In an alternative embodiment, the slag, sands, and other contaminants that do not pass through the screen 212 may be recirculated back into the inner cylinder 14 for further processing (e.g. for another pass through the scrap separation device 10).

The two cylinders (12, 14) of the scrap separation device 10 may be rotated by the actions of a motor 26 and belt or chain 28, as described above with reference to FIG. 1. The motor 26 may be adjusted to change the speed of rotation of the cylinders (12, 14), and thus optimize the cleaning actions of the scrap separation device 10. Exemplary rotation speeds are between 1 and 50 rotations per minute (rpm), preferable between 1 and 10 rpm.

As disclosed above, the scrap separation device 10 may be used to clean ferrous and/or non-ferrous scrap metals of slags, sands, and other contaminants. In various embodiments, the device 10 may be configured to accommodate various different scrap feeds, such a different scrap sizes, different type and/or levels of contaminants, and different compositions. For example, the scrap separation device 10 of the presently disclosed invention may be used to clean or separate slag, sands, and other contaminates from a ferrous feed of scrap metal that is sized between 0 inches and 12 inches. In such a case, the paddles (310, 312, 314), apertures 316, and screen(s) 212 may be sized to accommodate the feed stream as generally described above (e.g. apertures of about 1 inch; screen size of about ¼ inch); and the heater(s) (420 and/or 430), and rate of rotation of the cylinders (12, 14) may be adjusted to optimize the separation of the contaminates from the scrap metal.

In certain other embodiments, the feed stream may be alumina balls used to filter aluminum in a deep bed filter. After use, aluminum attached to, or comingled with, the alumina balls may be separated as a powder as the alumina balls are cleaned of this aluminum powder in the scrap separation device 10. Furthermore, feed streams as varied as wet soil containing rocks or other larger sized materials may be separated using the device of the presently disclosed invention. In this latter example, the soil may be separated from the rock and other contaminates to produce a clean top soil. Thus, as disclosed, the various embodiments of the scrap separation device may be configured for a variety of separation processes. The feed streams used as input to the device may be any low quality ferrous or non-ferrous scrap which may originate from foundry waste, residential waste, or any other residual waste which may benefit from separation.

The feed stream may comprise contaminates which may vary based on the material in the feed stream. As disclosed above, when the feed stream is a scrap metal from a foundry, the contaminants may comprise slag and/or sands. In certain situations, such a feed steam may have been stored for a period of time prior to separation, and may also comprise contaminates such as plastics, paper or cardboard, cloth, wood, or other trash. As such, the term contaminate may indicate any substance which is undesirable in the feed stream.

Figure 5:
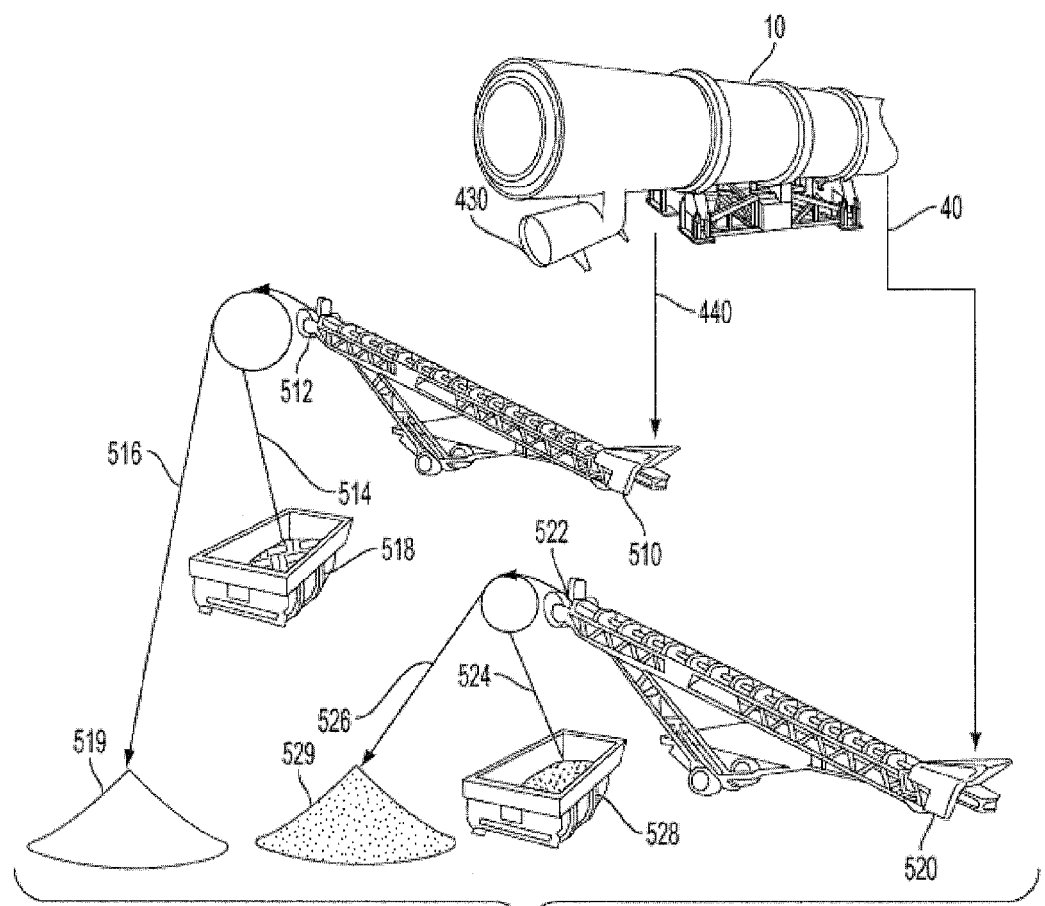
FIG. 5 illustrates a schematic view of a scrap separation system in accordance with certain aspects of the presently disclosed invention.
Figure 6:
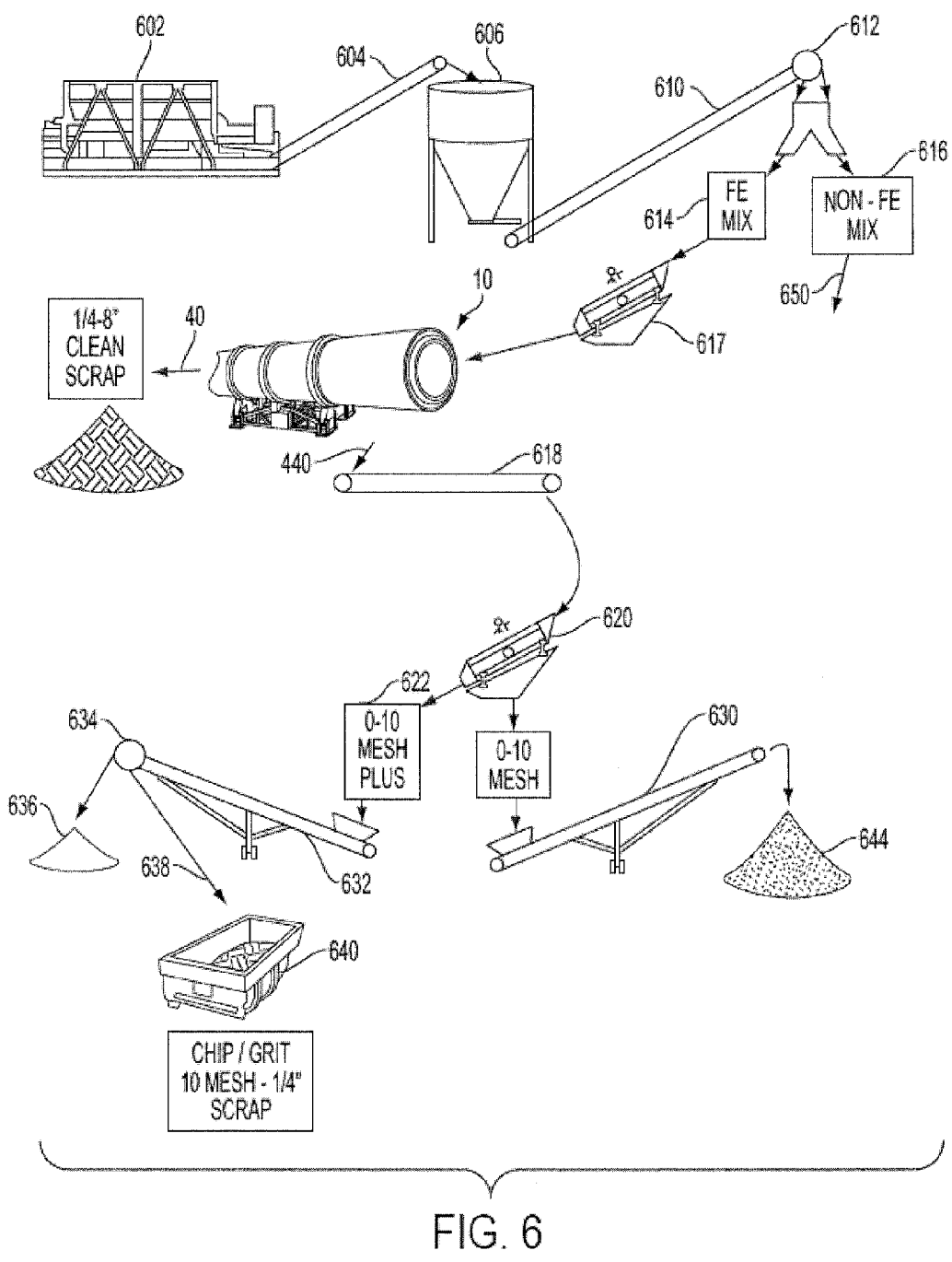
FIG. 6 illustrates a schematic view of an alternative scrap separation system in accordance with certain aspects of the presently disclosed invention.

Various embodiments of the scrap separation device 10 disclosed above may be included in a scrap separation system which may be used to clean and partition scrap metals into various size grades, and recovered the contaminating slag and sands as various size grades. The system comprising the scrap separation device 10 may also include at least one magnetic separation unit and/or at least one screening unit. Embodiments of scrap separation systems of the presently disclosed invention are shown in FIGS. 5 and 6. While two specific embodiments are illustrated and discussed below, various other configurations are within the scope of the presently disclosed invention.

As used herein, reference to "size grades" or "grades" of scrap metal is generally meant to indicate a relative size range, such as small medium and large. For example, it is generally known in the ferrous and non-ferrous scrap industry to refer to scrap metals as Grades A, B, and C. While these grades do not have an industry standard definition, they are generally taken to indicate size ranges as follow: Grade A is large pieces of scrap metal of between about 4 to 6 inched and 12 inches; Grade B is medium pieces of scrap metal of between ¾ to 1 inch and 4 to 6 inches; and Grade C is small pieces of scrap metal of between 0 inches and about 1 inch.

With specific reference to FIG. 5, a scrap separation system may comprise a scrap separation device 10, as described above, which includes at least one heater 430. Scrap metal substantially cleaned of slag, sands, and other contaminants may exit the scrap separation device 10 to provide a scrap metal feed stream 40. The scrap metal feed stream 40 may be transported by a conveyance device 520 to a magnetic head pulley 522 where the ferrous and non-ferrous scrap metals may be separated into feed streams 524 and 526, respectively. The ferrous feed stream 524 may be collected 528 for re-use as a clean metal product. For example, ferrous scrap metal typically includes steel and iron scraps which may be recycled into new steel products at a foundry. The non-ferrous feed 526 may comprise sand or slag clumps that may be collected 529 and recycled through the scrap separation device 10 in an effort to extract/clean more ferrous scrap metal product.

Slag, sands, and other contaminants removed from the dirty scrap metal may exit the scrap separation device 10 as feed stream 440, and may be transported by conveyance device 510 to magnetic head pulley 512. The magnetic head pulley 512 may separate the ferrous material 514 from the non-ferrous material 516. The ferrous material 514 likely comprises steel and/or iron particles, such as chromite, which may be collected 518 and recycled, such as into new steel products at a foundry. The non-ferrous material 516, which may comprise mainly sands or small slags, may be collected 519 for use as a construction aggregate, in concrete products, in road bases and surfaces, and as fill, clinker raw material, railroad ballast, roofing, mineral wool (for use as insulation) and soil conditioner.

Another embodiment of the scrap separation system of the presently disclosed invention is shown in FIG. 6. Dirty scrap material may be collected in a system feed 602, or at any other collection point, and may be passed via a conveyance device 604 to a surge hopper 606. Material from the surge hopper 606 may be passed via another conveyance device 610 to a magnetic head pulley 612 where the ferrous 614 and non-ferrous 616 materials are separated. The non-ferrous materials 616 may be stored at a collection point 650 for other uses, or treatment in another system where additional ferrous materials may be liberated (e.g. such as a crusher).

Alternatively, a simple electromagnet may be used to collect ferrous materials and place them into a sizing or screening device 617, or directly into a scrap metal separation device 10 via a chute or other transport device. In certain embodiments of the system, the transport device may be one or more of a scalping device, a conveyor belt, a screw auger, a pneumatic transport, a vibratory conveyor, a surge hopper, a feeder, a slider chute, or any combination thereof. Further, the system may also comprise one or more of a conveyor belt, a vibratory conveyor, a feeder, a slider chute, or combinations thereof, which transports the scrap metal from the magnetic separation unit to the scrap separation device.

In certain embodiments, the sizing device 617 may be any type of screening equipment and can include grizzlies, bar screens, wedge wire screens, radial sieves, banana screens, multi-deck screens, vibratory screen, fine screens, flip flop screens, and wire mesh screens. Screens can be static, as is typical for very coarse material, or they can incorporate mechanisms to shake or vibrate the screen. In a preferred embodiment, the screening device 617 may be a high frequency vibratory screen.

The ferrous material 614 may be passed over the screening device 617 to generate a feed stream having specific size requirements for entry to the scrap separation device 10. The input to the scrap separation device 10 may be selected to be not larger than 12 inches in any dimension, for example, or even not larger than 8 inches in any dimension. Alternatively, the screening device 617 may be used to remove smaller ferrous particles prior to entry into the scrap separation device.

The scrap separation device 10 may be operated as described above to release any contaminating slag, sands, or other materials from the scrap metal. The cleaned scrap metal 40 may exit from the device 10 and be collected for reuse/recycling. The size of the scrap metals collected as stream 40 depends on the selection of the scrap metal input size and the aperture size(s) 316. In an exemplary embodiment of the scrap separation device 10, the cleaned scrap metal 40 may be between ¼ and 8" in diameter.

The slag, sands, or other contaminants released from the scrap metal may exit the scrap separation device 10 as feed stream 440, and may be transported via a conveyance device 618 to a high frequency (vibrating) screening device 620. In an exemplary embodiment of the system, the screening device 620 may use a 10 mesh screen, where material smaller than 10 mesh 626 may be passed through the screen 620 to another conveyance device 630 to be deposited at a collection point 644.

The inclusion of this additional screening device 620 after the feed stream 440 has already passed through screen(s) on the scrap separation device 10 further improves the sizing of the feed stream 440. For example, material which may be long and thin, such as a piece of rebar, may pass through the apertures and screen(s) on the scrap separation device 10 due to the rotation of the device, which may cause the rebar to be position lengthwise relative to the apertures/screen(s). Once this material has exited the device 10 as feed stream 440, it will lie flat on the conveyance device 618 prior to entry to the screening device 620. As such, while screening device 620 may have a similar mesh size as the apertures or screen(s) on the separation device 10, it will essentially provide screening in another dimension (e.g. the rebar would be held up by the screen).

With continued reference to FIG. 6, the material not passed through the screen 620, which may be 10 mesh or larger (622) in the described embodiment, may be passed to another conveyance device 632 and another magnetic head pulley 634. The magnetic head pulley 634 may then separate the ferrous material 638 for collection as 10 mesh to ¼ inch ferrous scrap 640 and the non-ferrous 636 material for collection as 10 mesh to ¼ inch non-ferrous scrap 639.

As discussed above, the ferrous materials 638 likely comprises steel and/or iron, which may be collected 640 and recycled, such as into new steel products at a foundry. The non-ferrous materials, which may comprise mainly sands 644 or small slags 639, may be collected for use as a construction aggregate, in concrete products, in road bases and surfaces, and as fill, clinker raw material, railroad ballast, roofing, mineral wool (for use as insulation) and soil conditioner.

In the systems described above with reference to FIGS. 5 and 6, the various components may be included and/or arranged to achieve the desired end products. As shown by the differences in the embodiments of FIG. 5 and FIG. 6, additional screening units, conveyance devices, and magnetic separation devises may be included to sort the cleaned scrap metal and released slag, sands, and other contaminates based on a size or grade. While specific sizes have been given in exemplary embodiments, the presently disclosed invention may be used with other sizes and/or configurations or arrangements. Furthermore, reference to a feed stream or simply to a "feed" throughout the description or claims may be reference to a single piece of scrap metal or to any amount of scrap metal greater than a single piece.

The presently disclosed invention further includes a method for removing slag, sands, and other contaminates from a scrap metal feed. In certain embodiments, the method first comprises separating a dirty scrap metal feed into a ferrous component comprising slag, sands and contaminants and non-ferrous component. This may be accomplished using any magnetic separation device known in the art, including at least a magnetic head pulley or an electromagnet. Next, the ferrous component may be loaded into a scrap separation device to separate a feed of scrap metal substantially cleaned of slag, sands, or other contaminants and a feed of slag, sands, or other contaminants. The scrap separation device may be as substantially described in any of the embodiments disclosed above. In the method, the feed of scrap metal may be substantially cleaned of slag, sands, or other contaminants using indirect heat to release the contaminants, kinetic energy to discharge the released contaminants, and size separation to allow discharged contaminates to be separated from the feed of scrap metal.

Both the feed of scrap metal substantially cleaned of slag, sands, or other contaminants, and the feed of slag, sands, or other contaminants may be collected for a final use or for further processing. For example, in certain embodiments of the method, the feed of slag, sands, or other contaminants may be separated into a ferrous waste stream and a non-ferrous waste stream using a magnetic separation device. In certain other embodiments, the feed of slag, sands, or other contaminants may be separated by size using a high frequency screening device.

Furthermore, in certain embodiments of the method, the feed of scrap metal substantially cleaned of slag, sands, or other contaminants may be separated into a ferrous product stream and a non-ferrous waste stream using a magnetic separation device. In certain other embodiments, the feed of scrap metal substantially cleaned of slag, sands, or other contaminants may be separated by size using a high frequency screening device.

The previous description is provided to enable any person skilled in the art to practice the various exemplary implementations described herein. Various modifications to these variations will be readily apparent to those skilled in the art, and the generic principles defined herein may be applied to other implementations. All structural and functional equivalents to the elements of the various illustrious examples described throughout this disclosure that are known or later come to be known to those of ordinary skill in the art are expressly incorporated herein by reference.

What is claimed is:

1. A scrap separation device for separating scrap metals from slag, sands and contaminants, the device comprising:
    an inner cylinder having a first end for receiving a scrap metal comprising slag, sands and contaminants and a second end for dispatching the scrap metal which is substantially cleaned of the slag, sands and contaminants, wherein a portion of the inner cylinder at or near the second end comprises apertures therethrough sized to pass a portion of the slag, sands and contaminants and retain the scrap metal;
    an outer cylinder concentric with the inner cylinder, the outer cylinder having a first end and a second end, wherein the outer cylinder collects the slag, sands and contaminants passed through the apertures in the inner cylinder;
    a plurality of paddles positioned on an inner surface of the inner cylinder, wherein the paddles placed at or near the first and second ends of the inner cylinder are angled to urge the scrap metal longitudinally from the first end toward the second end of the inner cylinder, and the paddles in a middle region of the inner cylinder are designed to increase the residence time of the scrap metal in the middle region relative to the residence time of the scrap metal in the first and second ends and cause the scrap metal to be lifted and dropped during rotation of the inner cylinder;
    at least one helical vane positioned substantially between the inner cylinder and the outer cylinder to move the collected slag, sands and contaminants longitudinally through the outer cylinder;
    at least one heater positioned to heat an outer surface of the outer cylinder;
    a base for supporting the inner and outer cylinders horizontally along their longitudinal axes; and
    a means for rotating the inner and outer cylinders along their longitudinal axes.

2. The device of claim 1, wherein the paddles in the middle region of the inner cylinder are positioned parallel to the longitudinal axis of the inner cylinder and occupy a region corresponding to about one third the total length of the inner cylinder.

3. The device of claim 1, wherein the paddles at or near the first and second ends of the inner cylinder are angled at about 25 degrees relative to the longitudinal axis of the inner cylinder and occupy a region corresponding to about one third the total length of the inner cylinder at each of the ends of the inner cylinder.

4. The device of claim 1, wherein the paddles extend radially from the inner wall of the inner cylinder and have a radial depth which is twice the length of the majority of the scrap metal.

5. The device of claim 1, wherein the apertures are circular and are between 1 inch and 2 inches in diameter.

6. The device of claim 1, wherein the means for rotating the inner and outer cylinders along their longitudinal axes comprises a motor attached to the base and configured to drive a belt or chain that cooperates with an outer surface of the outer cylinder.

7. The device of claim 1, wherein the portion of the inner cylinder comprising apertures is not more than one-half of the length of the inner cylinder.

8. The device of claim 1, wherein the at least one helical vane positioned on the inner surface of the outer cylinder moves the collected slag, sands and contaminants toward the first end of the outer cylinder.

9. The device of claim 1, wherein the outer cylinder comprises at least one screen at or near the first end.

10. The device of claim 1, wherein the at least one heater heats the outer surface of the outer cylinder at the first end of the outer cylinder corresponding to a length of about one half the total length of the outer cylinder measured.

11. The device of claim 1, wherein the at least one heater is adjustable.

12. The device of claim 11, wherein the adjustment is to the temperature output of the heater.

13. The device of claim 11, wherein the adjustment is to the length of time that the heater is active.

14. The device of claim 4, wherein the scrap metal has a dimension on any side not larger than twelve inches.

15. A system for separating scrap metal from slag, sands and contaminants, the system comprising:
  a magnetic separation unit configured to accept scrap metal comprising slag, sands and other contaminants from a transport device and separate the scrap metal into ferrous and non-ferrous scrap metal comprising slag, sands and other contaminants; and
  a scrap separation device which accepts either the ferrous or non-ferrous scrap metal comprising slag, sands and other contaminants from the magnetic separation unit, the device comprising:
    an inner cylinder having a first end for receiving a scrap metal comprising slag, sands and contaminants and a second end for dispatching the scrap metal which is substantially cleaned of the slag, sands and contaminants, wherein a portion of the inner cylinder at or near the second end comprises apertures therethrough sized to pass a portion of the slag, sands and contaminants and retain the scrap metal,
    an outer cylinder concentric with the inner cylinder, the outer cylinder having a first end and a second end, wherein the outer cylinder collects the slag, sands and contaminants passed through the apertures in the inner cylinder,
    a plurality of paddles positioned on an inner surface of the inner cylinder, wherein the paddles placed at or near the first and second ends of the inner cylinder are angled to urge the scrap metal longitudinally from the first end toward the second end of the inner cylinder, and the paddles in a middle region of the inner cylinder are designed to increase the residence time of the scrap metal in the middle region relative to the residence time of the scrap metal in the first and second ends and cause the scrap metal to be lifted and dropped during rotation of the inner cylinder;
    at least one helical vane positioned substantially between the inner cylinder and the outer cylinder to move the collected slag, sands and contaminants longitudinally through the outer cylinder;
    at least one heater positioned to heat an outer surface of the outer cylinder;
    a base for supporting the inner and outer cylinders horizontally along their longitudinal axes; and
    a means for rotating the inner and outer cylinders along their longitudinal axes.

16. The system of claim 15, wherein the transport device is one or more of a scalping device, a conveyor belt, a screw auger, a pneumatic transport, a vibratory conveyor, a surge hopper, a feeder, a slider chute, or any combination thereof.

17. The system of claim 15, further comprising:
  one or more of a conveyor belt, a vibratory conveyor, a feeder, a slider chute, or combinations thereof, which transports the scrap metal from the magnetic separation unit to the scrap separation device.

18. The system of claim 15, further comprising:
  a primary screening grid positioned before the magnetic separation unit, wherein the primary screening grid prevents oversized scrap metal comprising slag, sands and other contaminants from entering the magnetic separation unit.

19. The system of claim 18, wherein oversized scrap metal comprising slag, sands and other contaminants has a dimension on any side larger than twelve inches.

20. The system of claim 15, wherein the means for rotating the inner and outer cylinders of the scrap separation device comprises a motor attached to the base and configured to drive a belt or chain that cooperates with an outer surface of the outer cylinder.

21. The system of claim 15, wherein the portion of the inner cylinder comprising apertures is not more than one-half of the length of the inner cylinder.

22. The system of claim 15, wherein the at least one helical vane positioned on the inner surface of the outer cylinder moves the collected slag, sands and contaminants toward the first end of the outer cylinder.

23. The system of claim 15, wherein the at least one heater of the scrap separation device is adjustable.

24. The system of claim 23, wherein the adjustment is to the temperature output of the heater.

25. The system of claim 23, wherein the adjustment is to the distance of the heater from the outer surface of the outer cylinder.

26. The system of claim 15, further comprising:
  at least one screen positioned to separate the scrap metal cleaned of the sands and contaminants based on a size of the scrap metals.

27. The system on claim 26, wherein the screen separates the scrap metals cleaned of the sands and contaminants into grade A, grade B, or grade C scrap metal.

28. The system of claim 26, wherein the scrap metal has a dimension on any side not larger than twelve inches.

29. The system of claim 22, further comprising:
  a second magnetic separation unit configured to accept the collected slag, sands and contaminants from the first end of the outer cylinder of the scrap separation device.

30. A method for removing slag, sands, and other contaminates from a scrap metal feed, the method comprising:
  separating a dirty scrap metal feed into a ferrous component comprising slag, sands and contaminants and non-ferrous component;
  loading the ferrous component into a scrap separation device to produce a feed of scrap metal substantially cleaned of slag, sands, or other contaminants and a feed of slag, sands, or other contaminants, wherein the scrap separation device comprises:
    an inner cylinder having a first end for receiving the ferrous component and a second end for dispatching the feed of scrap metal substantially cleaned of slag, sands, or other contaminants, wherein a portion of the inner cylinder at or near the second end comprises apertures therethrough sized to pass a portion of the slag, sands and contaminants and retain the ferrous component,
    an outer cylinder concentric with the inner cylinder, the outer cylinder having a first end and a second end, wherein the outer cylinder collects the slag, sands and contaminants passed through the apertures in the inner cylinder, a plurality of paddles positioned on an inner surface of the inner cylinder, wherein the paddles placed at or near the first and second ends of the inner cylinder are angled to urge the scrap metal longitudinally from the first end toward the second end of the inner cylinder, and the paddles in a middle region of the inner cylinder are designed to increase the residence time of the scrap metal in the middle region relative to the residence time of the scrap metal in the first and second ends and cause the scrap metal to be lifted and dropped during rotation of the inner cylinder;

at least one helical vane positioned substantially between the inner cylinder and the outer cylinder to move the collected slag, sands and contaminants longitudinally through the outer cylinder;

at least one heater positioned to heat an outer surface of the outer cylinder;

a base for supporting the inner and outer cylinders horizontally along their longitudinal axes; and a means for rotating the inner and outer cylinders along their longitudinal axes;

collecting the feed of scrap metal substantially cleaned of slag, sands, or other contaminants; and collecting the feed of slag, sands, or other contaminants.

31. The method of claim 30, further comprising:

separating the feed of slag, sands, or other contaminants into a ferrous waste stream and a non-ferrous waste stream using a magnetic separation device.

32. The method of claim 30, further comprising:

separating the feed of slag, sands, or other contaminants by size using a high frequency screening device.

* * * * *